US012637173B2

(12) United States Patent
Ackermann et al.

(10) Patent No.: US 12,637,173 B2
(45) Date of Patent: May 26, 2026

(54) DRIVE UNIT FOR MEANS OF LOCOMOTION SIMULTANEOUSLY DRIVABLE BY HUMAN MUSCULAR STRENGTH AND ELECTRIC MOTORS

(71) Applicant: KILLWATT GMBH, Tirschenreuth (DE)

(72) Inventors: Hans Peter Ackermann, Tirschenreuth (DE); Volker Ackermann, Tirschenreuth (DE)

(73) Assignee: KILLWATT GMBH, Tirschenreuth (DE)

( * ) Notice: Subject to any disclaimer, the term of this patent is extended or adjusted under 35 U.S.C. 154(b) by 491 days.

(21) Appl. No.: 18/248,698

(22) PCT Filed: Sep. 24, 2021

(86) PCT No.: PCT/EP2021/076342
§ 371 (c)(1),
(2) Date: May 4, 2023

(87) PCT Pub. No.: WO2022/078730
PCT Pub. Date: Apr. 21, 2022

(65) Prior Publication Data
US 2023/0391420 A1     Dec. 7, 2023

(30) Foreign Application Priority Data

Oct. 13, 2020    (DE) .......................... 102020212905.3

(51) Int. Cl.
B62M 6/60        (2010.01)
F16H 49/00       (2006.01)
(Continued)

(52) U.S. Cl.
CPC ............. B62M 6/60 (2013.01); F16H 49/001 (2013.01); H02K 7/08 (2013.01); H02K 7/116 (2013.01); H02K 7/18 (2013.01); B62K 2204/00 (2013.01)

(58) Field of Classification Search
None
See application file for complete search history.

(56) References Cited

U.S. PATENT DOCUMENTS 2,943,508 A      7/1960  Walton
8,443,924 B2 *   5/2013  Pesenti ................. F16D 43/215
                                                   180/205.2

(Continued)

FOREIGN PATENT DOCUMENTS

DE          1135259        8/1962
DE      102017219608       5/2019

(Continued)

OTHER PUBLICATIONS

English translation of International Search Report from corresponding PCT Appln. No. PCT/EP2021/076342, dated Dec. 14, 2021.

(Continued)

*Primary Examiner* — Vicky A Johnson
(74) *Attorney, Agent, or Firm* — Secant Intellectual Property Law

(57)          ABSTRACT
A narrow drive unit for a means of locomotion drivable simultaneously by drive energy provided by human muscular strength and by electric motors, comprising two harmonic gearings and two electric motors, wherein the sum of the drive energy provided by human muscular strength and the electric motors can be transmitted to an output shaft.

23 Claims, 5 Drawing Sheets

(51) Int. Cl.
H02K 7/08 (2006.01)
H02K 7/116 (2006.01)
H02K 7/18 (2006.01)

(56) References Cited

U.S. PATENT DOCUMENTS

| | | |
|---|---|---|
| 2004/0055404 A1 | 3/2004 | Mills et al. |
| 2018/0015985 A1 | 1/2018 | Doerndorfer |
| 2025/0026441 A1* | 1/2025 | Erjavec .................. B62M 19/00 |

FOREIGN PATENT DOCUMENTS

| | | |
|---|---|---|
| DE | 102019006708 | 3/2021 |
| EP | 0093888 | 11/1983 |
| EP | 1642820 | 4/2006 |
| EP | 2218635 | 8/2010 |
| EP | 3247619 | 3/2020 |
| FR | 2816386 | 5/2002 |
| JP | 4-101048 | 9/1992 |
| JP | 8-276887 | 10/1996 |
| JP | 2001-180565 | 7/2001 |
| WO | 2019/069084 | 4/2019 |

OTHER PUBLICATIONS

Office Action from related Japanese Appln. No. 2023-523594, dated Jul. 7, 2025. English translation attached.

* cited by examiner

DRIVE UNIT FOR MEANS OF LOCOMOTION SIMULTANEOUSLY DRIVABLE BY HUMAN MUSCULAR STRENGTH AND ELECTRIC MOTORS

FIELD

The invention relates to a drive unit for a means of locomotion simultaneously drivable through drive energy provided by human muscular strength and electric motors.

BACKGROUND

Generic means of locomotion include, for example, single- or multi-track vehicles such as bicycles, in particular electric bicycles, e-bikes or pedelecs, but also water bicycles, pedal boats or wheelchairs. In particular, generic means of locomotion include vehicles of vehicle categories L1e, L2e, L3e, L4e, Lye, L6e and L7e according to Article 4 of EU Regulation 2013/168/EU of Jan. 15, 2013. Further, they include in particular vehicles designed for a maximum speed of up to 6 km/h, vehicles intended exclusively for use by physically disabled persons, such as wheelchairs, vehicles intended exclusively for use in sporting competition, pedal-driven bicycles with pedal assistance, which are equipped with an electric motor-based auxiliary drive with a maximum continuous rated power of up to 250 W, the assistance of which is interrupted when the rider stops pedaling and the assistance of which progressively decreases as the vehicle speed increases and is interrupted before the speed of the vehicle reaches 25 km/h, self-balancing vehicles with electric motor-based propulsion, pedal-propelled sports vehicles, pedal-propelled vehicles that do not have at least one seat, and pedal-propelled vehicles with an R-point (according to ECE-R 17)≤400 mm. They frequently have a front wheel and at least one rear wheel connected by a frame. However, there may also be multiple rear wheels, for example two rear wheels, and/or multiple front wheels, for example two front wheels, and in particular any combination thereof. These wheels may, for example, be arranged side by side transversely to a forward direction of travel, such as on a wheelchair, a tricycle, or a vehicle with a sidecar, or one behind the other in a forward direction of travel, such as on a tandem. Such means of locomotion are increasingly equipped with at least one electric motor to assist the user in propelling the means of locomotion. Typically, they are not powered by this electric motor alone, but the electric motor assists the user in propelling the means of locomotion through his own human muscular strength. In most cases, the degree of assistance is selectable. In this way, a user can apply exactly as much of his own power as he can or wants to during a trip with such a means of locomotion, while still moving at a comfortable speed usable in everyday life.

In addition to assisting the user in propelling the means of locomotion, it is also already known to equip drive units for such means of locomotion with two electric motors and a summation gear. In this way, a continuously variable transmission (CVT) can be implemented, which is controlled by a control unit, for example. The operator then does not have to select the currently appropriate gear from a large number of available discrete gears, as is the case with conventional bicycles, for example. Instead, the transmission ratio suitable for the current driving situation is continuously adjusted by the control unit by controlling at least one of the electric motors at the summation gear. Such drive units are known, for example, from EP 1 642 820 A1 and EP 2 218 635 A1. In these documents, planetary transmissions are used as summation gears.

A problem with the existing drive units is their size, especially transversely to the longitudinal axis of the means of locomotion. The drive unit is typically arranged at or near a wheel hub or at or near a drive bearing, such as a bottom bracket. Firstly, the drive unit should not protrude too far beyond the wheel on either side. Secondly, when arranging them at the bottom bracket, it should be noted that, for example, the crank arms of the pedals of a bicycle should typically maintain a maximum axial distance of 140-180 mm from each other due to the human anatomy. Since the drive unit is likewise located between the crank arms, it is obvious that it should be designed as narrow as possible to enable the rider to drive comfortably even over long distances. However, this entails a number of design problems as rotary bearings and freewheels required in the drive units each require a certain amount of space. Typically, the summation gears and the electric motors likewise occupy a non-negligible amount of installation space in the drive units, especially in the direction of the rotation axis of, for example, the bottom bracket or the rear wheel, which increases the overall width of the drive units beyond the desired extent.

SUMMARY

It is therefore the object of the present invention to provide a drive unit which is as narrow as possible, in particular transversely to the direction of travel of the means of locomotion. At the same time, the drive unit should be controllable in a flexible manner and be able to cover the entire range of functions of modern drive units.

The object is achieved with a drive unit according to the independent claim. Preferred embodiments are cited in the dependent claims. Moreover, the invention also encompasses a means of locomotion having such a drive unit.

The drive unit according to the invention comprises an input shaft for transmitting drive energy generated or provided through human muscular strength. The input shaft may thus be, for example, the crankshaft of a bicycle or be connected to the crankshaft in a co-rotating manner. Alternatively, the input shaft may also be connected to a gearwheel of a traction means, such as the chainring, in a co-rotating manner. The input shaft is thus arranged such that it can be set in rotation by an operator or rider of the means of locomotion through human muscular strength, for example by pedaling on the bicycle. This can be done directly or indirectly. In particular, this should take place upstream of an electric motor in the direction of force flow from the point of introduction of human muscular strength into the entire drive train.

The drive unit according to the invention further comprises an output shaft for delivering drive energy to a travel unit. The travel unit is, for example, at least one wheel (or a propeller in the case of means of locomotion in water) which is set in rotation by the drive energy transmitted by the output shaft, causing the means of locomotion to move. Alternatively, the output shaft may be connected to a gearwheel of a traction means, such as the chainring, in a co-rotating manner. Alternatively, the output shaft may also be configured for co-rotation with a hub housing, which transmits the rotational movement, for example via spokes, to a travel unit. The output shaft transmits its rotation to the travel unit of the means of locomotion, which is why the drive unit is configured to apply a rotation to the output shaft that corresponds to a desired travel speed of the means of locomotion. In the direction of force flow from the point of introduction of human muscular strength, the output shaft is thus functionally arranged between the input shaft and the travel unit driven by the drive unit.

Accordingly, the drive unit is configured to transfer the drive energy from the input shaft to the output shaft. At the same time, however, it is also envisaged that the drive unit is configured such that it can adapt the speed and torque transmitted to the output shaft to current requirements of the operating situation. For this purpose, the drive unit comprises a harmonic drive gearing arranged around a rotation axis with a first wave generator, a first flexspline and a ring gear. The axis of rotation may be, for example, the pedaling axis of a bottom bracket or the wheel axis of a travel unit, in particular a travel unit driven by the drive unit. A harmonic or strain wave gearing is a type of gearing that is particularly suitable for the purpose at hand due to its simple and narrow configuration as well as its robustness and high reduction ratio. harmonic gearings per se have been described in the prior art and are known to the skilled person, for example from DE 1 135 259 B. They can, for example, translate high speeds with low torques of the wave generator into low speeds with high torques of the flexspline and/or the ring gear and vice versa. Moreover, the drive unit comprises an electric drive motor arranged around the rotation axis and having a stator and a rotor, wherein drive energy of the electric drive motor can be transmitted to the output shaft via the harmonic drive gearing. The electric drive motor can therefore be used to assist the rider or the rider's human muscular strength to transfer drive energy provided by the electric motor to the output shaft and thus contribute to the locomotion of the means of locomotion. Due to the comparatively high reduction ratio of the harmonic gearing, the high speeds and low torques of the electric motor can be converted into low speeds with high torques, which can be used to drive the means of locomotion. For this purpose, the electric drive motor is preferably in operative drive connection with the wave generator of the harmonic drive gearing. In other words, the rotor of the electric drive motor is preferably connected to the wave generator in a co-rotating manner, or is even integrally formed with it. In the present case, the output of the harmonic drive gearing is preferably formed by the ring gear. In particular, the ring gear is connected to the output shaft of the drive unit in a co-rotating manner.

In addition, the drive unit according to the invention has a harmonic variation gearing arranged in the drive train between the input shaft and the output shaft and having a second wave generator, a second flexspline and a ring gear. The drive unit according to the invention thus comprises two harmonic gearings at the same time, which, however, may perform different tasks functionally, as will be explained in more detail below. Specifically, the harmonic variation gearing is arranged to receive drive energy provided by human muscular strength from the input shaft and transmit it to the output shaft of the drive unit. For this purpose, for example, the input shaft is connected in a co-rotating manner (for example via a freewheel, which will be explained in more detail below) to a slowly rotating gearing part of the harmonic variation gearing, for example the flexspline or the ring gear. Preferably, the input shaft is connected to the flexspline in a co-rotating manner and thus introduces the drive energy derived from human muscular strength into the harmonic variation gearing via the flexspline. In this preferred embodiment, the ring gear is connected to the output shaft in a co-rotating manner so that drive energy derived from human muscular strength is transmitted to the ring gear via the flexspline, thereby driving the output shaft. Since the flexspline permanently engages the ring gear via a spline, a speed of the input shaft can initially be transmitted one-to-one to the output shaft. However, for example, a transmission ratio between input speed via the flexspline and output speed via the ring gear can be influenced using the wave generator that is also present. According to the invention, an electric variation motor, in particular arranged around the rotation axis, with a stator and a rotor is provided for this purpose, the drive energy of which is likewise introduced into the harmonic variation gearing. This arrangement further makes it possible for the harmonic variation gearing to transfer the summed energy from human muscular strength and the electric variation motor to the output shaft. This includes both the case where additional energy is added to the incoming energy from human muscular strength toward the output shaft, and the case where the electric variation motor counteracts the incoming energy generated from human muscle power, thus subtracting drive energy toward the output shaft. In particular, the electric variation motor is operatively connected to the wave generator of the harmonic variation gearing. For example, the rotor of the electric variation motor is configured for co-rotation with the wave generator. The drive energy provided by the electric variation motor is therefore also transmitted via the wave generator to the ring gear of the harmonic variation gearing and, in particular, to the output shaft. The harmonic variation gearing transmits the speed ratio from the input shaft to the output shaft and/or, in doing so, sums the drive energy derived from human muscular strength and the energy derived from the electric variation motor. Preferably, the harmonic variation gearing and/or the electric variation motor are arranged around the rotation axis, resulting in a compact configuration with advantageous force flow.

In the drive unit according to the invention, the ring gear of the harmonic drive gearing and the ring gear of the harmonic variation gearing are configured for co-rotation with each other. This can be achieved by connecting elements that connect the two ring gears in a co-rotating manner, for example fixing pins or similar. However, it is also possible and also preferred in this case to form the two ring gears integrally with each other. Thus, in this embodiment, a ring gear unit is provided which has two internal toothings spaced apart in the axial direction of the rotation axis, one for engagement of the first flexspline and one for engagement of the second flexspline. The two internal toothings may be separated from each other in the axial direction or may merge directly into each other in the axial direction. This co-rotating configuration of the two ring gears enables the summed drive energy from human muscular strength, the electric drive motor and the electric variation motor to be transferred to the output shaft at this point. This ring gear unit thus forms the summation point of the two harmonic gearings of the drive unit toward the output shaft. In particular, both ring gears have an internal toothing that is complementary to an external toothing of the respective flexspline (with an increased number of teeth of the internal toothing of the ring gear compared to the external toothing of the flexspline, which is typical for harmonic gearings). The two harmonic gearings of the drive unit are therefore operatively connected to each other via this common ring gear. In particular, the two harmonic gearings use the common ring gear as output or gearing output, whereby the ring gear, and thus also the output shaft, is provided with the entire resulting drive energy or drive power of the two electric motors and the human muscular strength. Thus, according to a first key idea, the invention uses two harmonic gearings via which the summed drive energy or drive power of the two electric motors and of the rider of the means of locomotion is transmitted to the operatively connected ring gears or to the common ring gear and from here to the output shaft. This enables a particularly narrow configuration of the drive unit. The use of a common ring gear or two ring gears of two gearings, which are configured to co-rotate with each other, as the summation point and/or gearing output, as described above, is generally helpful for any drive system with two gearings in order to save axial installation space, for example, irrespective of the gearing types used, as long as these can output via a ring gear, in particular additionally in the case of the configuration of the motors described above. Therefore, this aspect, in addition to embodiments of the concept specifically described in this application, constitutes a separate and distinct invention that is independent of the structural and functional features of the exemplary embodiments described herein and could be claimed separately.

The electric drive motor and/or the electric variation motor are preferably synchronous motors, in particular three-phase synchronous motors, preferably with external rotors. In the embodiment described by the invention, these are characterized by particularly narrow dimensions.

Depending on the direction of rotation of the electric variation motor, it can transmit the speed introduced by the rider via the input shaft to the output shaft at different ratios. This transmission ratio results in a speed variation of the output shaft with respect to the input shaft. For example, the output shaft may be accelerated or decelerated relative to the input shaft, and the electric variation motor is also capable of maintaining a set transmission ratio for a long time without further acceleration or deceleration. This is preferably used such that the harmonic variation gearing, in particular with the electric variation motor, forms a continuously variable transmission between the input shaft and the output shaft. By controlling the speed of the electric variation motor, the speed of the output shaft can be increased or reduced to any desired degree relative to the input shaft. In conjunction with a control unit explained in more detail below, it is therefore possible to set a pedal speed and pedal resistance that is comfortable for the rider in any riding situation without being constrained to predefined, stepped gears.

According to a preferred embodiment of the invention, at least one of the flexsplines is formed as a sleeve extending in the direction of the rotation axis. Preferably, both flexsplines are each formed as sleeves extending in the direction of the rotation axis. The respective sleeve is connected on one axial side to a rotary bearing which rotatably supports the sleeve, for example, relative to a stationary or static housing. Toward the other axial side, the respective sleeve has an engagement region for the wave generator and in particular also the external toothing for the ring gear. A sleeve cavity is located between the rotary bearing and the wave generator as seen in the direction of the rotation axis. The sleeve cavity thus describes a volume enclosed by the flexspline and in particular the sleeve, especially as seen from the rotation axis in radial direction. The configuration of the flexspline with sleeve as a flexspline cup is helpful with respect to its bending and twisting properties and thus faultless operation of the harmonic gearing. However, according to the invention, the sleeve cavity is preferably used to save installation space in a very effective manner. Therefore, at least one of the electric motors, preferably both, is arranged in the axial direction of the rotation axis at least partially, preferably completely, in the sleeve cavity of the harmonic gearing associated with the respective electric motor. In other words, for example, the electric drive motor may be arranged in the axial direction of the rotation axis at least partially, preferably completely, in the sleeve cavity of the harmonic drive gearing, and/or the electric variation motor may be arranged in the axial direction of the rotation axis at least partially, preferably completely, in the sleeve cavity of the harmonic variation gearing. The respective electric motor is thus preferably at least partially and preferably completely enclosed in radial direction by the respective sleeve of the flexspline. The respective specification regarding the electric motors refers in particular to the axial extent of the rotor and/or stator of the respective electric motor along the rotation axis. According to a preferred embodiment, the electric drive motor and/or the electric variation motor is therefore surrounded by the sleeve of the flexspline in radial direction of the rotation axis over the entire axial extent of its rotor and/or stator. In this way, the sleeve cavity is structurally used to accommodate at least one electric motor and preferably both electric motors, which saves installation space. This is achieved particularly efficiently if the two flexspline sleeves are arranged with their external toothings facing each other in the axial direction of the rotation axis.

Another preferred embodiment of the invention likewise relates to an arrangement of the electric motors that saves as much space as possible. For this, it is preferred that the wave generator, the flexspline and the ring gear of the harmonic drive gearing and/or the harmonic variation gearing are each arranged overlapping one another in a gearing plane perpendicular to the rotation axis. The wave generator, the flexspline and the ring gear of the respective harmonic gearing are thus arranged in succession in radial direction of the rotation axis, in particular in the mentioned order from the inside to the outside and/or in alignment in radial direction. In addition, the flexspline, in particular the sleeve of the flexspline, is mounted for rotation relative to a counter bearing in a bearing plane perpendicular to the rotation axis. In the context of the present application, the counter bearing refers, for example, to a stationary or static part of the drive unit and is, for example, stationary together with a housing or housing part. Preferably, the electric drive motor and/or the electric variation motor are arranged at least partially and preferably completely between the gearing plane and the bearing plane. This also refers in particular to the axial extent of the rotor and/or stator of the respective electric motor along the rotation axis.

For the electric motors of the drive unit according to the invention to be controllable particularly precisely, in particular by a control unit explained in more detail below, it is preferred that at least one, in particular contactless, speed and/or rotation angle sensor, in particular a Hall sensor, is provided at the electric drive motor and/or at the electric variation motor. Moreover, to accommodate the corresponding sensors in the drive unit in the most space-saving manner possible, additionally or alternatively, the at least one, in particular contactless, speed and/or rotation angle sensor is arranged in particular in the sleeve cavity of the flexspline. The respective sensor is therefore preferably likewise surrounded by the sleeve of the flexspline in radial direction of the rotation axis. Moreover, the respective sensor is preferably likewise located between the gearing plane and the bearing plane.

Due to the large number of components of the drive unit that can be rotated relative to one another and the rotatability of various components relative to the fixed housing, a large number of rotary bearings, for example (grooved) ball bearings, are necessary in order to arrange these components so that they can rotate relative to one another, in particular about the rotation axis. The arrangement is preferably such that these elements, which are rotatable relative to one another, can all be rotated about a common rotation axis, in particular the bottom bracket axis or the rotation axis of a travel unit. The challenge in the actual structural implementation is that these rotary bearings, in order to be able to fulfill their respective function, naturally have a minimum width, which, especially when accumulated over many rotary bearings in the axial direction, contribute significantly to the overall width of the drive unit. The invention therefore also provides for saving installation space in the axial direction of the rotation axis by intelligent arrangement of the rotary bearings. For example, it is preferred that a rotary bearing for the output shaft and a rotary bearing for the input shaft are arranged in a common shaft bearing plane perpendicular to the rotation axis. These two rotary bearings are thus preferably arranged one above the other or overlapping each other in radial direction relative to the rotation axis. It is particularly preferred that the two rotary bearings are configured as ball bearings with a same axial extent along the rotation axis and overlap completely in radial direction of the rotation axis. The two rotary bearings are therefore arranged next to each other not in the axial direction but in radial direction, so that the width of one of the rotary bearings along the rotation axis is saved. This arrangement of the rotary bearings for the output shaft and for the input shaft is generally useful for any drive system to save axial installation space, for example regardless of the gearing types used and the configuration of the motors. This applies in particular to its use for an electric motor-assisted bicycle, such as an e-bike or a pedelec. Therefore, this aspect, in addition to embodiments of the concept specifically described in this application, constitutes a separate and distinct invention that is independent of the structural and functional features of the exemplary embodiments described herein and could be claimed separately.

In order to limit the axial width or extent of the drive unit, it is known, for example, to arrange multiple gearing s or multiple motors next to each other not in axial direction but in radial direction with respect to the rotation axis. In other words, in order to limit the extent of the drive unit transverse to the direction of travel of the means of locomotion, an extent in the direction of travel or in vertical direction was accepted. However, the aim of the present invention is to avoid such an increased size of the drive unit in the direction of travel and/or in vertical direction. It is therefore preferred that the two electric motors and/or the two harmonic gearings are arranged around the rotation axis in a coaxial manner. The two electric motors and/or the two harmonic gearings thus have in particular the same rotation axis. Such an arrangement is not only particularly compact, but also has advantages in terms of force flow through the drive train.

The fact that the two harmonic gearings have a common ring gear, at least functionally or also structurally, makes it particularly space-saving if the two harmonic gearings are arranged close together. It is therefore preferred to form the two harmonic gearings adjacent to each other with respect to the axial direction of the rotation axis. Further out in the axial direction, they are preferably directly followed by the electric motors. Still further out in the axial direction, the rotary bearings of the flexsplines then follow, which rotate relative to a stationary counter bearing and may also include freewheels, for example. Overall, it is therefore preferred that the harmonic gearings and the electric motors, and in particular the rotary bearings of the flexsplines rotating relative to a stationary counter bearing, and in particular also freewheels between the flexsplines and a static housing part, are configured and arranged symmetrically to each other with respect to a symmetry plane running perpendicular to the rotation axis. The components mentioned are thus preferably arranged along the rotation axis in a mirror-symmetrical manner with respect to the symmetry plane. This also has the advantage that, to a large extent, the harmonic variation gearing and the harmonic drive gearing can be based on duplicate or identical components, so that the diversity of parts in the drive unit can advantageously be kept comparatively low.

As already explained, according to the invention, the hollow shafts of the harmonic gearings are used as gearing output. The drive energy derived from human muscular strength can therefore be introduced into the harmonic variation gearing either via the wave generator or the flexspline. Preferably, the input shaft is connected to the flexspline of the harmonic variation gearing in a co-rotating manner in at least one direction of rotation, and the energy derived from human muscular strength is introduced into the harmonic variation gearing via the flexspline. For this, the input shaft is preferably connected to the flexspline of the harmonic variation gearing via a freewheel, wherein the freewheel locks or establishes a co-rotating connection in particular in a forward direction of rotation or forward direction of travel of the input shaft and thereby transmits the corresponding rotational movement to the ring gear via the freewheel and the flexspline. The freewheel also makes it possible, for example, to pedal backwards freely, or for the output shaft to be rotated faster by the two electric motors than the input shaft rotated by a rider.

A further freewheel is preferably arranged on the flexspline of the harmonic drive gearing. In particular, the flexspline of the harmonic drive gearing is mounted on a stationary housing part via a freewheel. This freewheel rotates freely in particular when the flexspline rotates in the forward direction of travel, and blocks in particular when the flexspline would rotate against the forward direction of travel. When the means of locomotion moves forward, the output shaft and the common ring gear rotate forward. This also causes the flexspline of the harmonic drive gearing to be rotated forward. Since the freewheel rotates freely in this direction of rotation, the rotor of the electric drive motor does not have to be dragged along. Therefore, if the means of locomotion is driven without assistance by the electric motor, for example through pure human muscular strength, this can be done with low pedal resistance. If, on the other hand, the electric drive motor is operated to transmit a supporting torque to the ring gear and thus the output shaft, the flexspline is supported on the stationary housing via the freewheel so that the drive energy is transmitted from the electric drive motor via the wave generator and the flexspline to the ring gear and thus the output shaft.

As already described, the freewheel is preferably arranged on the flexspline of the harmonic drive gearing such that it freewheels when the means of locomotion is moving forward and the electric drive motor is applying no or only a small amount of drive energy. In these situations, it may be desirable to operate the electric drive motor as a generator to recuperate kinetic energy. To achieve this, the freewheel is preferably switchable between a switching position that freewheels in one direction of rotation and a switching position that engages, i.e., does not freewheel, in this direction of rotation. In this direction of rotation, the freewheel thus acts as a switchable clutch, in other words. Alternatively, a separate clutch unit may be provided which can establish a co-rotating connection between the freewheel and a stationary housing part, which also bypasses the freewheel and achieves the same result. In this way, it is possible for the electric drive motor to be operated as a generator that takes drive energy from the ring gear and converts it into electrical energy. If the freewheel is switched to its non-freewheeling position, this means that it also establishes a co-rotating connection between the flexspline and a stationary housing part in the forward direction of rotation. This blocks the flexspline and prevents it from rotating. In this way, drive energy is transferred from the ring gear to the wave generator and thus to the electric drive motor, which then acts as a generator and converts this drive energy into electrical energy, for example to charge a storage device for electrical energy. In this way, the means of locomotion can in particular be decelerated with recovery of electrical energy. This use of a switchable freewheel and/or a separate clutch unit to operate the electric drive motor as a generator can generally be implemented with any drive system having an electric motor, for example regardless of the types of gearing used and the configuration of the one or more motors. Therefore, this aspect, in addition to embodiments of the concept specifically described in this application, constitutes a separate and distinct invention that is independent of the structural and functional features of the exemplary embodiments described herein and could be claimed separately.

One particular application of the described switchable freewheel on the flexspline of the harmonic drive gearing arises in pedelecs, for example: According to legal regulations, riding a pedelec may only be assisted by an electric motor up to a maximum speed, for example 25 km/h (45 km/h for S-pedelecs). Above this maximum speed, the power introduced by the electric motor of the drive unit must be zero. Nevertheless, it is preferred that the rider can ride even faster beyond this speed limit through human muscular strength, for which purpose a speed-increasing transmission of the rotation of the input shaft to the output shaft is desired. In the case of the drive unit according to the invention, this means that the electric variation motor, i.e., the electric motor of the harmonic variation gearing, which is responsible for adjusting the transmission ratio from the input gear shaft toward the output gear shaft, must also transmit drive energy via the harmonic variation gearing to the ring gear and thus the output shaft. To ensure that this does not violate the legal regulations, it is preferred that the electric drive motor is operated as a generator when the legally specified maximum speed is exceeded. In particular, the electric drive motor is then operated such that, as a generator, it diverts precisely that drive energy or drive power from the ring gear and converts it into electrical energy that corresponds to the drive energy or drive power that the electric variation motor applies to the ring gear. A corresponding "negative" drive power of the electric drive motor could alternatively also be achieved by driving the electric drive motor in a direction of rotation opposite to the electric variation motor, for example at a speed and/or torque corresponding to the electric variation motor. What is important is that in this operating state, the summed drive energy or drive power of the two electric motors totals zero, so that the pedelec is driven purely by human muscular strength and therefore the legal requirements are met. Overall, it is therefore preferred that above a maximum travel speed of the means of locomotion the electric drive motor is operated with drive power opposite to that of the variation electric motor and of equal amount—either as a motor or as a generator—so that the total drive power applied to the output shaft by the electric motors is zero. The corresponding control of the electric motors takes place via the control unit described in more detail below. Furthermore, a suitable sensor system is provided which obtains the operating data relevant for the control unit, such as the current travel speed of the vehicle driven via the drive unit, etc. The drive unit only provides a desired transmission ratio between the input shaft and the output shaft without introducing supporting drive energy or drive power acting in the forward direction of the vehicle.

As already explained above for the rotary bearings, the freewheels also have a necessary minimum axial extent along the rotation axis. It is therefore also advantageous to arrange the freewheels with at least one rotary bearing radially overlapping with respect to the rotation axis in order to reduce their common axial extent overall. It is therefore preferred that a rotary bearing between a counter bearing and the flexspline of the harmonic drive gearing is arranged so as to overlap with a freewheel in a bearing plane perpendicular to the rotation axis. Additionally or alternatively, a rotary bearing between a counter bearing and the flexspline of the harmonic variation gearing is arranged so as to overlap with a freewheel in a bearing plane perpendicular to the rotation axis. In particular, it is preferred that the rotary bearings and the freewheels overlap at least half, relative to their respective axial extent along the rotation axis, preferably at least two-thirds and most preferably completely. The counter bearing is a stationary part, i.e., it does not co-rotate with the drive unit, and is connected, for example, to other stationary housing parts of the drive unit in a non-rotating manner.

A further saving of axial width of the drive unit is achieved by preferably arranging a rotary bearing in a plane perpendicular to the rotation axis together with a harmonic gearing. The rotary bearing thus overlaps with the harmonic gearing in radial direction of the rotation axis. For example, it may be the rotary bearing of the rotor of an electric motor. Such rotary bearings are necessary anyway and must therefore be placed in a space-saving manner. According to a preferred embodiment of the invention, the wave generator, the flexspline and the ring gear of the harmonic drive gearing and/or the harmonic variation gearing are therefore arranged in a gearing plane perpendicular to the rotation axis together with a rotary bearing for the rotor of the electric drive motor and/or the electric variation motor, in particular with respect to a counter bearing. In this embodiment, the rotary bearing of the rotor of the electric motor is thus displaced into the harmonic gearing and, in particular, nested with it. Particularly preferably, the corresponding rotary bearing has an axial extent that corresponds to the axial extent of further components of the harmonic gearing, for example the wave generator or the rotary bearing, in particular ball bearing, between the wave generator and the flexspline. Preferably, the rotary bearing overlaps these elements completely, as seen in radial direction and in relation to the axial extent.

A number of planes oriented perpendicular to the rotation axis have already been described above, in each of which various components of the drive unit are arranged in radial overlap to reduce an axial extension of the drive unit along the rotation axis. Another such plane is the electronics bearing plane, which is likewise perpendicular to the rotation axis and in which a rotary bearing, in particular a ball bearing, and a control unit are arranged. For example, the rotary bearing is arranged between the stationary housing and the crankshaft if the drive unit is arranged around the crankshaft, or the rotary bearing is arranged between a stationary housing portion, such as an axle body, and the rotating hub housing if the drive unit is arranged on a wheel hub. The electronic control unit will be discussed in more detail below. With regard to an optimum arrangement of the components of the drive unit relative to one another, it is preferred that, in the direction along the rotation axis, the shaft bearing plane, the bearing plane of the flexspline of the harmonic variation gearing, the gearing plane of the harmonic variation gearing, the symmetry plane, the gearing plane of the harmonic drive gearing, the bearing plane of the flexspline of the harmonic drive gearing and, in particular, also the electronics bearing plane are arranged in succession. This results in a particularly space-saving arrangement of the respective components.

As already indicated above, in the case of a bicycle, the drive unit may, for example, be located at the center of the frame in the region of the pedals or also at one of the wheel hubs. In a preferred embodiment, the drive unit is configured as a center drive unit, wherein in particular the rotation axis is arranged coaxially with a pedaling axis. The drive unit is arranged, for example, between the pedals and in particular between the pedal cranks. In this arrangement, the drive unit is passed through by a rotating axle, in particular the crankshaft, and has a stationary housing. In a preferred alternative, the drive unit is configured as a hub drive unit, wherein in particular the rotation axis is arranged coaxially with a wheel axis. The drive unit is therefore arranged at a wheel hub, for example at the rear wheel. In this case, the drive unit is passed through by a stationary axle body and has a rotating hub housing which transfers the rotational movement to the wheel via spokes. The drive unit is particularly preferably configured as a center drive unit, since the central position on the frame of a bicycle, for example, achieves a particularly good weight distribution with a low center of gravity arranged centrally along the longitudinal axis.

It is always advantageous to configure the axial extent of the drive unit as small as possible. In fact, this is of particular advantage when the drive unit is configured as a center drive unit, i.e., in the region of the bottom bracket axis. As mentioned at the beginning, based on average human anatomy, the aim is for the crank arms of the vehicle's pedals to be ideally 140-180 mm apart. This objective can be met with the measures described above. Depending on how consistently the measures are implemented, even tighter dimensions can be achieved. For example, it is preferred that the maximum extent of the drive unit along the rotation axis is not more than 150 mm, preferably not more than 135 mm, more preferably not more than 120 mm and in particular, for example, not more than 100 mm. The crank arms of the pedals, on the other hand, should preferably be spaced apart by not more than 200 mm, more preferably by not more than 170 mm, and most preferably by not more than 140 mm. In this way, comfortable and anatomically correct pedaling can be made possible even when the drive unit is configured as a center drive unit.

In a preferred embodiment, a control unit is provided for controlling the electric drive motor and/or the electric variation motor. The electronic control unit controls in particular the speed and/or the direction of rotation and/or the torque of the electric motors individually and independently of each other. The control unit also controls, for example, the setting of the continuously variable transmission provided by the drive unit such that comfortable pedaling is always possible regardless of the current travel speed. For example, the control unit controls the electric motors via a stored rotating field, for example a three-phase rotating field. In such rotating fields, both the speed and torque behavior of the motors are stored. The corresponding control of the electric motors is known in the prior art and is known to the skilled person, so that it will not be discussed in more detail here. The control unit may have a variety of different features and functions, as explained below.

In purely structural terms, the control unit is integrated into the drive unit. It is located in the electronics bearing plane already described, which is perpendicular to the rotation axis, for example together with a rotary bearing for a crankshaft. It is therefore not simply attached to the outside of the drive unit, but is nested with the gearing parts of the drive unit, which contributes to efficient use of the installation space.

To control the functions of the drive unit, it is necessary to determine various variables that reflect the current operating state and that the control unit takes into account when controlling the electric motors. For example, the control unit is connected to a rotation angle and/or speed and/or torque sensor at the input shaft. The input shaft is driven by the rider during operation, for example by pedaling, so that the corresponding variables can be used by the control unit, for example to infer the intentions of the rider, who will pedal more when he wants to accelerate, for example. In addition, the control unit is preferably connected to a travel speed sensor, which is arranged in particular in or on the hub of the rear wheel, on the rear wheel or its spokes, or on the brake disc, and which determines the overall travel speed of the means of locomotion. According to a preferred embodiment, the travel speed sensor is integrated into the drive unit and arranged together with it on the means of locomotion. In this case, the travel speed is determined at the output shaft, for example. This is particularly possible if the driven wheel of the means of locomotion, for example the rear wheel, does not have its own freewheel and the traction means gearwheel or the chain wheel on the drive unit is always rotated by the traction means at the speed of the driven wheel. Via the travel speed sensor, the control unit can, for example, check whether the travel speed is above or below a maximum speed above which, for example, no more assistance may be transmitted from the electric motors to the output shaft, as explained above. The control unit then takes over the corresponding control of the electric motors already described. Furthermore, the control unit is preferably connected to a speed and/or rotation angle sensor, in particular a Hall sensor, at the electric drive motor and/or the electric variation motor. Preferably, the control unit is also connected to an amperemeter for the electric drive motor and/or the electric variation motor. The amperage can be used by the control unit to infer the respective torque of the electric motors. Together with the speed, the control unit can use this to calculate the power of the electric motors and regulate them accordingly.

A main function of the control unit is preferably to control the speeds and torques of the electric drive motor and the electric variation motor such that the summed drive energy or drive power including the energy or power provided through human muscular strength at the output shaft corresponds to the energy or power requirement of the drive unit. The corresponding energy or power requirement is determined by the control unit based on the available measurement signals, for example taking into account the pedaling behavior of the rider, from which an intention to accelerate can be inferred, for example. The degree of electric motor-based assistance for the rider can be set at the control unit, for example, and is taken into account by the latter. Preferably, the control unit controls, for example, the speed of the electric drive motor in proportion to the travel speed. In this way, the electric drive motor always takes over the same proportion of the necessary drive energy or drive power at all travel speeds. Moreover, it is preferred that the control unit activates a drive support function or a brake function depending on the direction of rotation of a shaft driven by human muscular strength, for example the crankshaft or the input shaft. In this way, the drive unit implements a coaster brake, for example, by deriving a braking command from a backward pedaling action by the rider. In this situation, the control unit activates, for example, the switchable freewheel already described and operates the electric drive motor as a generator for recuperating kinetic energy into electrical energy, which brakes the means of locomotion.

Pedelecs with rear suspension have an effect called pedal kickback. This term describes the phenomenon that every compression of the suspension automatically causes a rotation of the traction means gearwheel, for example the chainring. This also rotates the crankshaft and crank arms along with the pedals, which is perceived as uncomfortable by a rider. The control unit is now preferably configured to partially and in particular completely compensate for the pedal kickback caused by the compression of the suspension of the means of locomotion by controlling the electric variation motor. For this purpose, the control unit is connected to a suspension travel sensor of the means of locomotion, which in particular determines the compression itself and its degree and forwards them to the control unit. By controlling the electric variation motor, the control unit can cause the crankshaft and thus also the pedals to rotate. Based on the determined suspension travel, the control unit is now configured to control the electric variation motor such that it counteracts the movement of the crankshaft caused by the pedal kickback. As a result, there is no rotation of the pedals despite the compression at the rear wheel. This compensation of the pedal kickback can generally be implemented with any drive system that can influence the position of the pedals. Therefore, this aspect, in addition to embodiments of the concept specifically described in this application, constitutes a separate and distinct invention that is independent of the structural and functional features of the exemplary embodiments described herein and could be claimed separately.

For the rider's information, the control unit may also be connected to a display unit. The display unit, in turn, could generally be connected to the control unit by a wired connection, for example, and arranged anywhere on the means of locomotion, such as on the handlebar. However, it is preferred that the display unit is likewise located inside the drive unit housing, such that it is visible from the outside through a viewing window in the drive unit. Together with the viewing window, it is therefore preferably located on the side of the drive unit facing away from a road surface, i.e. on the top side of the drive unit. The viewing window is made of a transparent material, for example glass or a plastic. The display unit preferably comprises at least one display of an information about the operating state of the means of locomotion, for example the current travel speed or a battery charge level. The display is preferably luminous and comprises LEDs, for example. During operation of the means of locomotion, the rider can, for example, look down at the drive unit and read the corresponding information on the display unit. The display unit in conjunction with a viewing window can basically be implemented for any drive unit that includes electronics. Therefore, this aspect, in addition to embodiments of the concept specifically described in this application, constitutes a separate and distinct invention that is independent of the structural and functional features of the exemplary embodiments described herein and could be claimed separately.

As has already been explained, the control unit can control the rotational position of the crankshaft and thus of the pedals by controlling the electric variation motor. For example, when riding a bicycle, it is typical that at least one of the pedals must be placed in a position oriented forward and upward each time the bicycle stops. Looking sideways at the crankshaft such that a forward direction of travel corresponds to a clockwise rotation of the crankshaft and pedals, one of the pedals should therefore be moved to the 2 o'clock position, for example. In this start-up position of the pedal, the rider can start comfortably and accelerate quickly. This positioning, which conventionally has to be set by the rider by pedaling backwards, can also be adjusted by the control unit. Thus, it is preferred that the control unit brings the input shaft into a starting position by controlling the electric variation motor. This function is executed, for example, whenever the control unit detects a standstill of the means of locomotion. In this way, the means of locomotion is always automatically made ready to start without the rider having to take care of this. This positioning of a pedal into a starting position can generally be implemented with any drive system that can influence the position of the pedals. Therefore, this aspect, in addition to embodiments of the concept specifically described in this application, constitutes a separate and distinct invention that is independent of the structural and functional features of the exemplary embodiments described herein and could be claimed separately.

BRIEF DESCRIPTION OF THE DRAWINGS

The invention will be explained in more detail below by reference to the embodiment examples shown in the figures. In the schematic figures.

DETAILED DESCRIPTION

Figure 1:
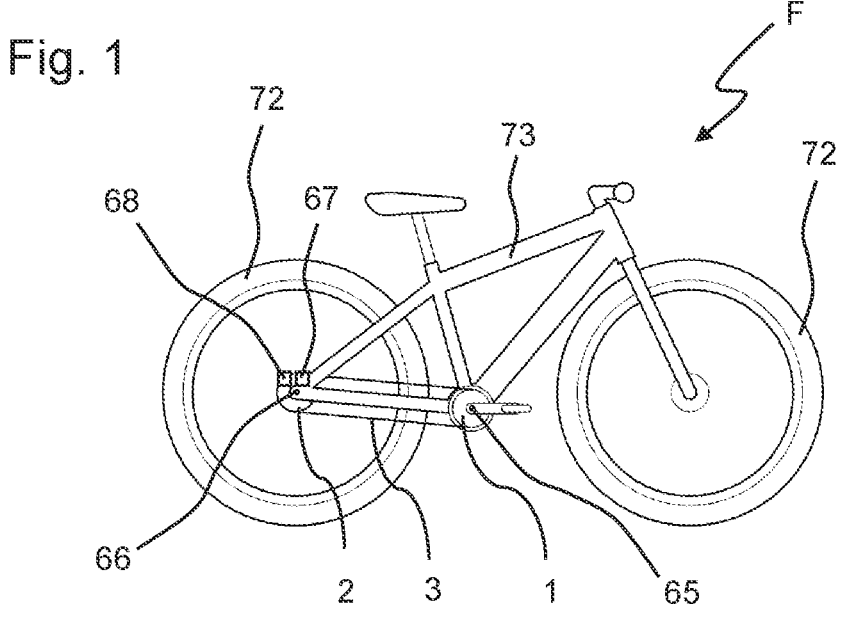
FIG. 1: is a side view of a means of locomotion with a center drive unit.

Like parts, or parts acting in a like manner, are designated by like reference numerals. Recurring parts are not designated separately in each figure.

Figure 2:
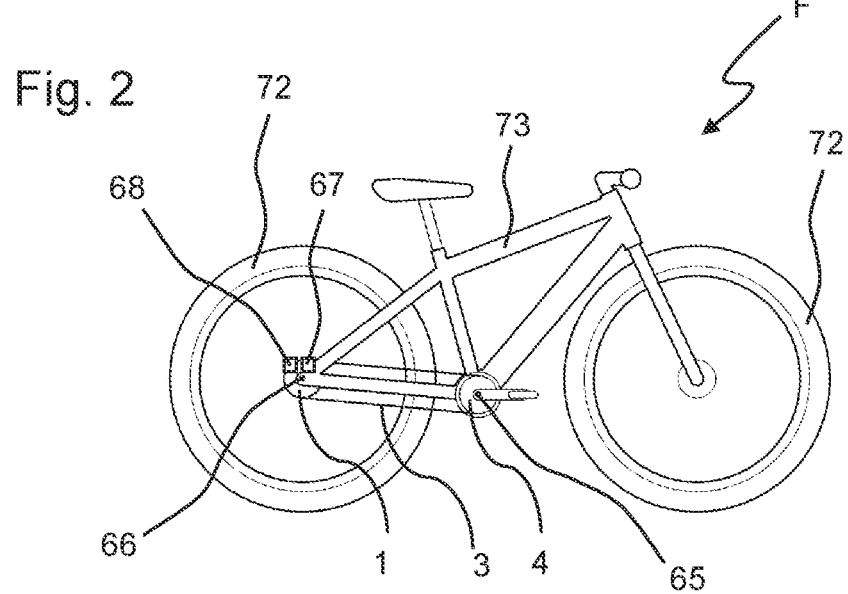
FIG. 2: is a side view of a means of locomotion with a hub drive unit

FIGS. 1 and 2 each show a means of locomotion F, more specifically a bicycle, in particular a pedelec. It can be driven simultaneously by electric motors and human muscular strength, especially such that the drive from human muscular strength is supported by electric motors. In a known manner, the means of locomotion F comprises a frame 73 and two travel units 72, more specifically a front wheel and a rear wheel. The pedal axis 65 is located at the center and at the lower end of the frame 73. The wheel axle 66 is located at the connection point of the frame 73 with the rear wheel. FIG. 1 shows an embodiment in which the drive unit 1 is configured as a center drive unit and lies on the pedal axis 65. Human muscle power is applied directly to the drive unit 1 via the crankshaft. The transmission output of the drive unit 1 is configured as a traction means gearwheel 10 (see FIGS. 3 and 6) and is connected to the rear wheel hub 2 via a traction means 3, for example a chain. In the embodiment shown in FIG. 2, the drive unit 1 is configured as a hub drive unit and is arranged on the wheel axle 66. In this case, the transmission output of the drive unit 1 is configured as a hub housing, the rotational movement of which is transmitted to the rear wheel via the spokes 59 (see FIGS. 4 and 7). Via the traction means 3, the drive unit 1 is connected to the bottom bracket 4, through which human muscular strength is applied to the drive unit 1.

Figure 3:
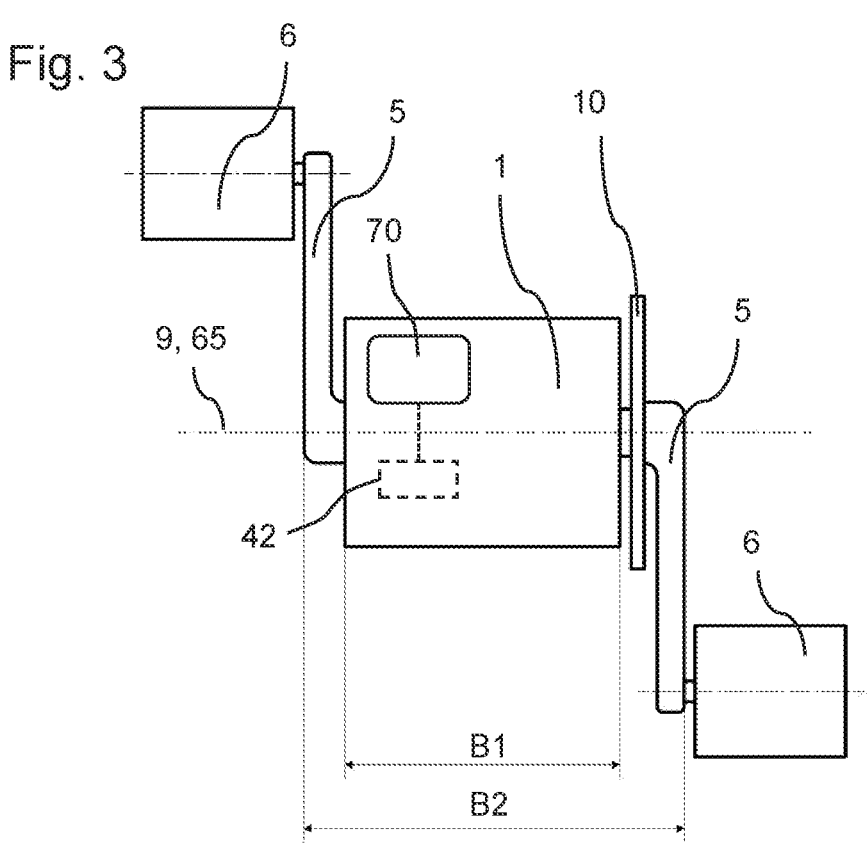
FIG. 3: is an external view, in particular a top view, of the center drive unit.
Figure 4:
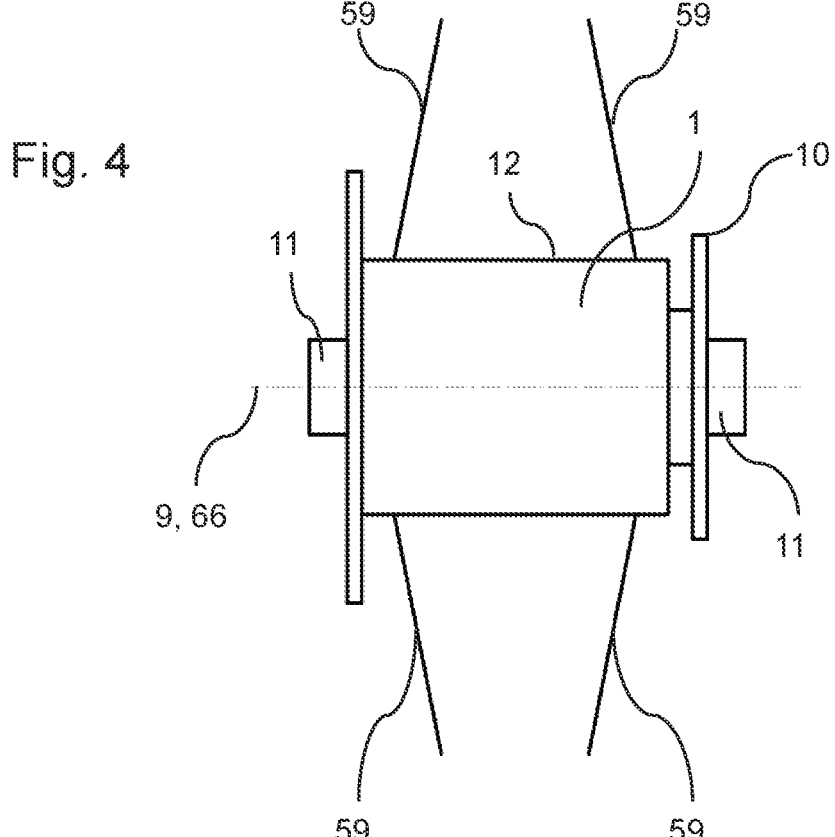
FIG. 4: is an external view, in particular a top view, of the hub drive unit.

FIGS. 3 and 4 each show a top view of the drive unit 1 from the outside. FIG. 3 shows the drive unit 1 as a center drive unit. The rotation axis 9 of the drive unit 1 lies on the pedaling axis 65 about which the crank arms 5 and the pedals 6 of the means of locomotion F rotate during a pedaling motion by an operator. The traction means gearwheel 10 serves to transmit the rotational movement to the rear wheel hub 2. The width of the drive unit 1 is designated with B1. The distance between the crank arms 5 is designated with B2. To allow comfortable pedaling with the pedals 6 which is adapted to the human anatomy, the distance B2 of the crank arms 5 should be between 140 and 180 mm. The width B1 of the drive unit 1 must therefore be correspondingly smaller. In addition, FIG. 3 shows the control unit 42, which is integrated into the drive unit 1. The control unit 42 is connected to a plurality of sensors to detect the operating state of the drive unit 1 and the means of locomotion F, as will be explained in more detail below. Moreover, the control unit 42 is connected to a display unit 70, for example a luminous display, which can be viewed from outside the drive unit 1. For example, the display unit 70 is arranged behind a viewing window in the outer housing of the drive unit 1. The display unit 70 can therefore be viewed by an operator seated on the means of locomotion F by glancing downward. FIG. 4 shows an embodiment in which the drive unit 1 is configured as a hub drive unit. The rotation axis 9 of the drive unit 1 is therefore located on the wheel axis 66 about which the rear wheel rotates when the means of locomotion F is in motion. A rotation originating from the pedals 6 is transmitted to the drive unit 1 via the traction means gearwheel 10. While the drive unit 1 as a center drive unit is passed through by a rotating crankshaft 32 (see FIG. 6), as a hub drive unit it is passed through by a stationary axle body 11 around which the rear wheel rotates. A part of the hub housing that rotates around the axle body 11 and is connected to the spokes 59 in a co-rotating manner serves as the transmission output and thus as the output shaft 12. The spokes 59 in turn transmit the rotational movement to the rest of the rear wheel.

Figure 5:
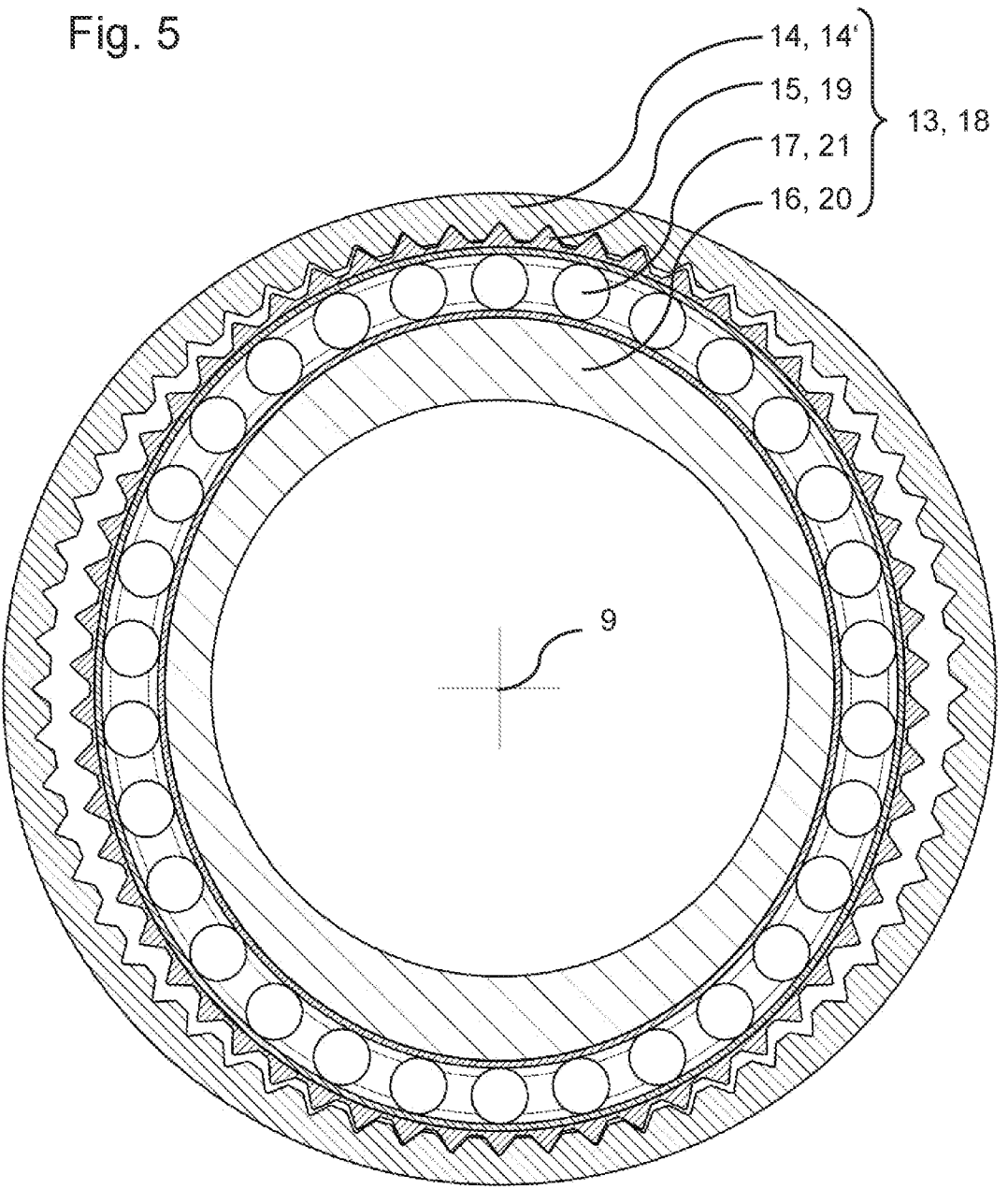
FIG. 5: shows a cross-section through a harmonic gearing.

FIG. 5 shows a cross-section through a harmonic gearing 13, 18 as used in the invention. The harmonic gearing 13, 18 is arranged around the rotation axis 9 and comprises a wave generator 16, 20, a rotary bearing 17, 21, in particular a (grooved) ball bearing, a flexspline 15, 19 and a ring gear 14, 14'. The ring gear 14, 14' and the wave generator 16, 20 are configured as rigid components, while the flexspline 15, 19 is flexible or elastic. The wave generator 16, 20 is oval and the flexspline 15, 19 is mounted on the wave generator 16, 20 via the rotary bearing 17, 21 such that the flexspline 15, 19 adapts to the oval shape of the wave generator 16, 20 due to its elasticity. The ring gear 14, 14' has an internal toothing and the flexspline 15, 19 has a complementary external toothing, with the flexspline 15, 19 typically having fewer teeth than the ring gear 14, 14'. Due to the oval shape of the wave generator 16, 20, the external toothing of the flexspline 15, 19 is pressed into the internal toothing of the ring gear 14, 14' along the major axis of the wave generator 16, 20. At the same time, the elastic deformation of the flexspline 15, 19 causes its external toothing along the minor axis of the wave generator 16, 20 to disengage from the internal toothing of the ring gear 14, 14'. When the wave generator 16, 20 rotates, the flexspline 15, 19 rotates in the opposite direction of rotation with a reduction ratio of $i=z_H/(z_H-z_F)$, where z H is the number of teeth of the ring gear 14, 14' and $z_F$ is the number of teeth of the flexspline 15, 19. When the flexspline 15, 19 is retained, the ring gear 14, 14' rotates at the corresponding reduced speed in the same direction as the wave generator 16, 20. Such harmonic gearings 13, 18 are summation-type gearings and are known in the prior art, and are therefore not explained in more detail here.

Figure 6:
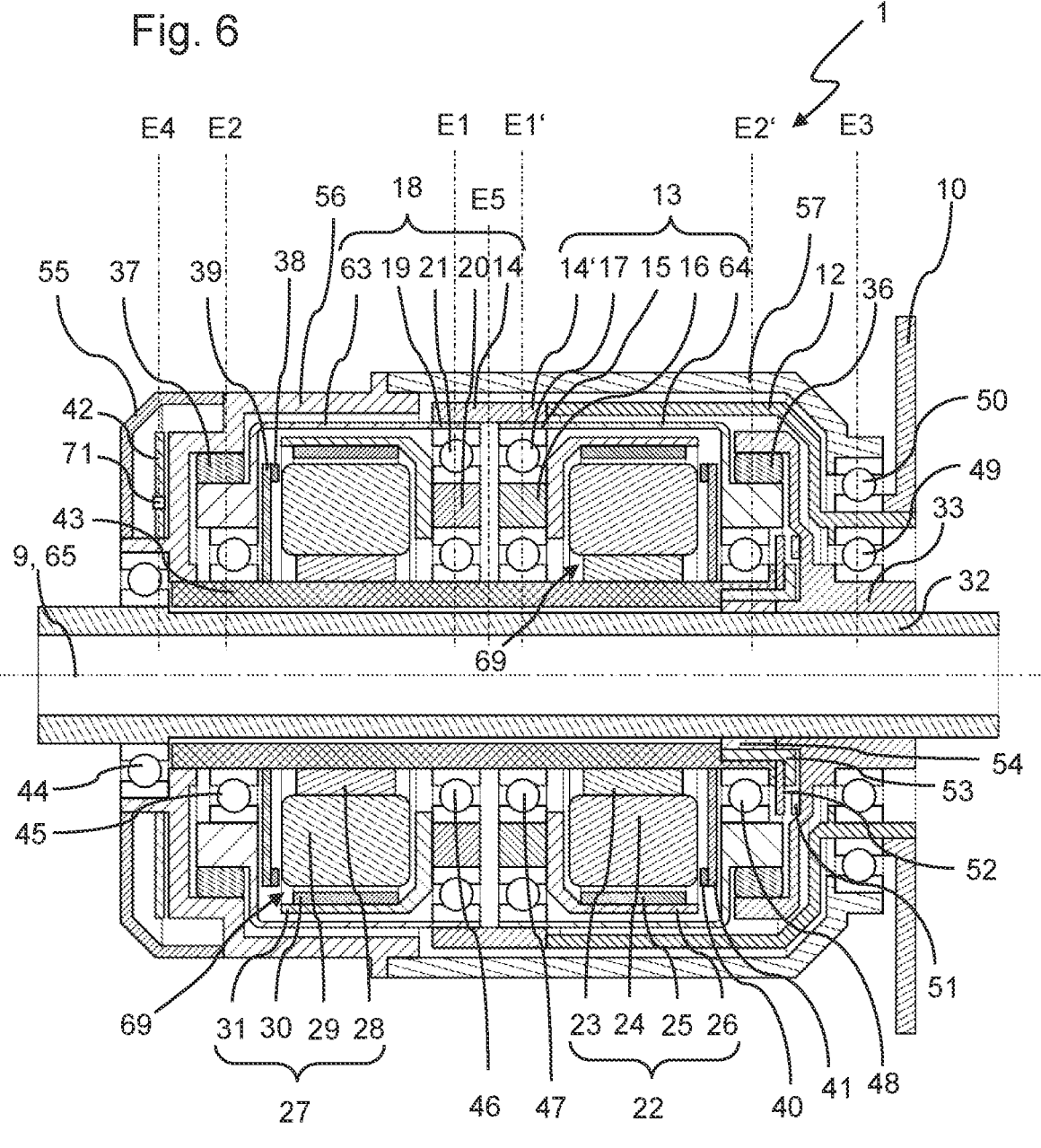
FIG. 6: is a cross-sectional view along the rotation axis through the center drive unit.

FIG. 6 shows a cross-section through the drive unit 1 configured as a center drive unit along the rotation axis 9 or the pedaling axis 65. The pedaling axis 65 is defined by the crankshaft 32, which is drivable by an operator via the pedals 6 and which passes through the drive unit 1 along the rotation axis 9. The crankshaft 32 is in co-rotating connection with the input shaft 33, through which the drive energy applied by the operator is introduced into the transmission of the drive unit 1. The transmission output is formed by the output shaft 12, which is connected to the traction means gearwheel 10, in this case the chainring, in a co-rotating manner. The drive unit 1 has three sources of drive energy or drive power: One is human muscular strength via the input shaft 33 and the other is two electric motors 22, 27, more specifically the electric variation motor 22 and the electric drive motor 27. Both electric motors 22, 27 are integrated into the drive train of the drive unit 1 via a respective harmonic gearing 13, 18. More specifically, the electric variation motor 22 is integrated into the drive train via the harmonic variation gearing 13 and the electric drive motor 27 is integrated into the drive train via the harmonic drive gearing 18.

When an operator rotates the crankshaft 32 by pedaling with the pedals 6, he thereby rotates the input shaft 33. The input shaft 33 is connected to the flexspline 15 of the harmonic variation gearing 13 via a freewheel 36. The freewheel 36 is configured such that it engages when the input shaft 33 rotates in the forward direction of travel and establishes a co-rotating connection between the input shaft 33 and the flexspline 15. During a rotation in reverse direction, on the other hand, the freewheel 36 rotates freely. As a result of the flexspline 15 meshing with the ring gear 14' of the harmonic variation gearing 13, the ring gear 14' rotates with the flexspline 15 with a one-to-one transmission ratio. The ring gear 14' in turn is in co-rotating connection with the output shaft 12 so that, overall, the drive energy introduced by the operator by pedaling with the pedals 6 is transmitted to the output shaft 12 and thus to the traction means gearwheel 10.

The electric variation motor 22 comprises a stator 23 having a stator winding 24. The stator 23 is arranged on a stationary counter bearing 43 which is arranged, for example, in a tubular shape around the crankshaft 32. In addition, the electric variation motor 22 comprises a rotor 26 with permanent magnets 25. The rotor 26 of the electric variation motor 22 is connected to the wave generator 16 of the harmonic variation gearing 13 in a co-rotating manner, in particular integrally. The electric variation motor 22 therefore drives the wave generator 16 of the harmonic variation gearing 13. Depending on the direction of rotation of the electric variation motor 22, the speed of the ring gear 14' is transmitted differently in relation to the speed of the input shaft 33. In this way, the transmission ratio between the input shaft 33 and the output shaft 12 can be continuously adjusted. If the electric variation motor 22 rotates in the same direction as the input shaft 33, the result is a speed increase from the input shaft 33 toward the output shaft 12, which means that the output shaft 12 rotates faster than the input shaft 33. Accordingly, a speed reduction from the input shaft 33 toward the output shaft 12 is obtained when the electric variation motor 22 rotates in the opposite direction relative to the input shaft 33. In this case, the output shaft 12 rotates slower than the input shaft 33. Overall, therefore, the electric variation motor 22 at the wave generator 16 and the input shaft 33 at the flexspline 15 each form a gearing input at the harmonic variation gearing 13. The ring gear 14' and the output shaft 12 form the gearing output. The electric variation motor 22 and the harmonic variation gearing 13 form a continuously variable transmission between the input shaft 33 and the output shaft 12. The ring gear 14' in this case forms the summation point between the two gearing inputs.

The electric drive motor 27 likewise comprises a stator 28 with stator windings 29 and a rotor 31 with permanent magnets 30. The stator 28 is arranged on a stationary counter bearing 43, similar to the electric variation motor 22. The rotor 31 of the electric drive motor 27 is connected to the wave generator 20 of the harmonic drive gearing 18 in a co-rotating manner, in particular integrally. Therefore, the electric drive motor 27 drives the wave generator 20 of the harmonic drive gearing 18. The rotation of the wave generator 20 transmits the drive energy of the electric drive motor 27 to the flexspline 19. The flexspline 19 is supported on a stationary housing part 56 via a freewheel 37. The drive energy is transmitted to the ring gear 14 of the harmonic drive gearing 18 via the flexspline 19. The ring gear 14 of the harmonic drive gearing 18 is in co-rotating connection with the ring gear 14' of the harmonic variation gearing 13 and, in particular, is formed integrally therewith as a common ring gear 14, 14' of both harmonic gearings 13, 18. In this common ring gear 14, 14', which is connected in a co-rotating manner or formed integrally, the drive energy or drive power of the two electric motors 22, 27 and the human muscular strength introduced via the crankshaft 32 is summed up and transmitted to the output shaft 12. The electric drive motor 27 is configured to supply the main part of the electrical drive energy or drive power for traveling operation of the means of locomotion F. To drive the ring gear 14 in the forward direction of travel, the wave generator 20 must likewise be rotated in the forward direction of travel. This results in an opposite direction of rotation of the flexspline 19, i.e., in the reverse direction. Therefore, in order for the drive energy to be transmitted from the wave generator 20 to the ring gear 14, the flexspline 19 must be supported in the reverse direction against a stationary housing part. Thus, the freewheel 37 is configured to establish a co-rotating connection between the flexspline 19 and the stationary housing part 56 when the flexspline 19 is rotated in reverse direction. A reverse rotation of the flexspline 19 is thereby prevented, so that all of the drive energy applied to the wave generator 20 by the electric drive motor 27 is transferred to the ring gear 14 and is available to drive the means of locomotion F.

If, on the other hand, the electric drive motor 27 is not operated or is operated only more slowly than the ring gear 14 is rotated, for example, by the operator through human muscular strength, the output shaft 12 rotates the ring gear 14 and, through its meshing with the flexspline 19, also rotates the flexspline 19 in the forward direction of travel.

However, in the direction of rotation of the flexspline 19 corresponding to the forward direction of travel, the freewheel 37 allows free rotation, whereby, in interaction with the rotary bearing 21 between the flexspline 19 and the wave generator 20, no drive energy is transmitted to the wave generator 20 and thus to the rotor 31 of the electric drive motor 27. Therefore, the electric drive motor 27 does not have to be dragged along by the rider when pedaling by pure human muscular strength, allowing for easy, comfortable pedaling with the pedals 6.

According to a preferred embodiment of the invention, the freewheel 37 is configured as a switchable freewheel 37. This means that it can be controlled by the control unit 42 such that it establishes a co-rotating connection between the flexspline 19 and the stationary housing part 56 in both directions of rotation. If the flexspline 19 is blocked in this manner also in a forward direction of rotation, drive energy is transmitted from the ring gear 14 to the wave generator 20 and thus to the rotor 31 of the electric drive motor 27. It is therefore then possible to operate the electric drive motor 27 as a generator, converting rotational energy from the ring gear 14 into electrical energy that can be fed into a battery, for example. By operating the electric drive motor 27 as a generator, the means of locomotion F is decelerated, so that this operation mode can also be used as a brake. In addition, as described above, the electric drive motor 27 can be operated to negatively compensate a drive energy or drive power input to the drive train by the electric variation motor 22, either as a generator or also in motor mode. This is useful, for example, for complying with legal regulations according to which, above a certain maximum speed, no more drive power may be transmitted from the electric motors 20, 27 to the output shaft 12. By the switchable freewheel 37 and the use of the electric drive motor 27 to negatively balance a power input by the electric variation motor 27, the electric variation motor 22 can still be driven to provide the continuously variable transmission even at a travel speed faster than the legal maximum speed. The output of drive energy into the drive train required for this is negatively compensated by the electric drive motor 27.

The present invention is characterized by a particularly narrow structure along the rotation axis 9. For this purpose, the drive unit 1 comprises a number of structural features, which are discussed below. Firstly, the invention uses two harmonic gearings 13, 18, which sum up both the drive energy or drive power of two electric motors 22, 27 and from human muscular strength in two ring gears 14, 14' connected to each other in a co-rotating manner or even formed integrally. Due to the configuration with a common ring gear 14, 14', the two harmonic gearings 13, 18 can be arranged close to each other, so that only a small amount of installation space is required in the axial direction of the rotation axis 9.

In addition, the flexsplines 15, 19 of the two harmonic gearings 13, 18 are configured with a sleeve 63, 64. The sleeve 63, 64 is a cylindrical extension of the flexsplines 15, 19 from their engagement region with the ring gear 14, 14' in the axial direction of the rotation axis 9. In this case, the two harmonic gearings 13, 18 lie axially along the rotation axis 9 in the center of the drive unit 1, while the sleeves 63, 64 extend away from the harmonic gearings 13, 18 and the center of the drive unit. At their axial end opposite the region of engagement with the ring gear 14, 14', the sleeves 63, 64 are each mounted on a stationary housing part, for example the counter bearing 43, via a rotary bearing 45, 48. The flexsplines 19 extend, in other words, as seen in the axial direction of the rotation axis 9, from a gearing plane E1, E1' arranged perpendicular to the rotation axis 9, in which the components of the harmonic gearings 13, 18, wave generator 16, 20, rotary bearing 17, 21, flexsplines 15, 19 and ring gear 14, 14' overlap in radial direction of the rotation axis 9, to a bearing plane E2, E2' in which the flexsplines 15, 19 overlap with the rotary bearings 45, 48 in radial direction of the rotation axis 9. The flexsplines 15, 19 each have a sleeve cavity 69 inside their hollow cylindrical bodies. In order not to leave any installation space unused here, in the shown embodiment examples of the invention the electric motors 22, 27 are arranged within the respective sleeve cavities 69, i.e., the electric variation motor 22 is arranged in the sleeve cavity 69 of the flexspline 15 of the harmonic variation gearing 13 and the electric drive motor 27 is arranged in the sleeve cavity 69 of the flexspline 19 of the harmonic drive gearing 18. In particular, the two electric motors 22, 27 are arranged over the entire axial extent of their stator 23, 28 with the stator windings 24, 29 and the rotor 26, 31 with the permanent magnets 25, 30 inside the flexsplines 15, 19, in particular in the corresponding sleeve cavities 69. Furthermore, the electric motors 22, 27 are arranged between the gearing plane E1, E1' and the bearing plane E2, E2'. More specifically, the electric variation motor 22 is located between the gearing plane E1' and the bearing plane E2', while the electric drive motor 27 is located between the gearing plane E1 and the bearing plane E2.

Another key idea of the present invention is to make the drive unit 1 particularly narrow in the axial direction of the rotation axis 9 by arranging various rotary bearings at a same height as other components in the axial direction of the rotation axis 9. The individual components of the drive unit 1 are therefore nested within each other as seen in the axial direction of the rotation axis 9, as are the electric motors 22, 27 with the harmonic gearings 13, 18 due to the arrangement in the sleeve cavity 69. For example, it is envisaged that the rotary bearing 46, for example a ball bearing, for the rotor 31 of the electric drive motor 27 is arranged opposite a stationary counter bearing 43 together with the harmonic drive gearing 18 in the gearing plane E1. For example, the rotary bearing 46 overlaps the other components of the harmonic drive gearing 18, such as the wave generator 20, the rotary bearing 21, the flexspline 19, and the ring gear 14, over its entire axial extent in the direction of the rotation axis 9. In this way, the rotary bearing 46 does not need to be formed in axial succession with these components of the harmonic drive gearing 18, which reduces the overall extent of the drive unit 1. The same applies to the rotary bearing 47 for the rotor 26 of the electric variation motor 22. This rotary bearing 47 is configured in the same way as the rotary bearing 46 and is arranged in a similar manner in the gearing plane E1' of the harmonic variation gearing 13.

Another implementation of this key idea can be found in the bearing planes E2, E2'. In the bearing plane E2 of the flexspline 19, viewed in radial direction of the rotation axis 9, there is an overlap between the rotary bearing 45, via which the flexspline 19 is mounted on the stationary counter bearing 43, and the freewheel 37 between the flexspline 19 and the stationary housing part 56. Similarly, viewed in radial direction of the rotation axis 9 in the bearing plane E2' of the flexspline 15, there is an overlap between the rotary bearing 48, via which the flexspline 15 is mounted on the stationary counter bearing 43, and the freewheel 36 between the flexspline 15 and the input shaft 33. This also reduces the overall axial extent of the drive unit 1.

The rotary bearings 49 and 50, both also preferably ball bearings, are also arranged in a common shaft bearing plane E3 perpendicular to the rotation axis 9. The rotary bearing 49 is arranged between the input shaft 33 and the output shaft 12, and supports them rotatably relative to each other. The rotary bearing 50 is arranged between the output shaft 12 and a stationary housing part 57. The rotary bearings 49, 50 are of identical configuration (except for the necessary difference in diameter), lie concentrically around the rotation axis 9 and, viewed in radial direction of the rotation axis 9, overlap in particular completely.

A further rotary bearing 44 between the crankshaft 32 and a stationary housing part 56 is located in a further electronics bearing plane E4 arranged perpendicular to the rotation axis 9, in which the rotary bearing 44 at least partially overlaps with the control unit 42 in radial direction of the rotation axis 9. This means that the control unit 42 is not merely attached to the outside of the drive unit 1, but is nested with gearing elements of the drive unit 1, which again saves axial extent. To the outside, the control unit 42 is covered by a housing cover 55.

A particularly compact configuration is achieved in that the harmonic gearings 13, 18, and in particular the flexsplines 15, 19, as well as the electric motors 22, 27, the rotary bearings 46, 47 for the rotors 26, 31 and the wave generators 16, 20 relative to the counter bearing 43, and the freewheels 36, 37 are configured and arranged symmetrically about a plane of symmetry E5. The plane of symmetry E5 is perpendicular to the rotation axis 9 and is arranged between the harmonic gearings 13, 18.

The control unit 42 is configured to control the electric motors 22, 27. In order to be able to perform the respective control functions, the control unit 42 requires various measured values regarding the current operating state of the drive unit 1 and the means of locomotion F. For example, the control unit 42 is connected to the suspension travel sensor 67 and the travel speed sensor 68 shown in FIGS. 1 and 2, both of which are arranged on the rear wheel. In addition, the control unit 42 is connected to an amperemeter 71, via which the control unit 42 measures the amperage in each of the electric motors 22, 27. In addition, the control unit 42 is connected to a Hall sensor 38 at the electric drive motor 27 via a printed circuit board 39 and to a Hall sensor 40 at the electric variation motor 22 via a printed circuit board 41. Both the printed circuit boards 39, 41 and the Hall sensors 38, 40 are likewise arranged with the respective electric motor 22, 27 in the respective sleeve cavity 69. These sensors 38, 40 can be used to determine the speeds and the rotation angle positions of the electric motors 22, 27. Another sensor unit 51, 52 connected to the control unit 42 has a stationary part 52 at the stationary housing, for example the counter bearing 43, and a part 51 rotating with the input shaft 33. The sensor unit 51, 52 determines, for example, the torque applied by human muscular strength to the crankshaft 32 and thus the input shaft 33, as well as the rotation angle position. The speed of the crankshaft 32 and thus of the input shaft 33 can likewise be determined via the derivative with respect to time of the rotation angle position. The stationary part 52 of the sensor unit 51, 52 is fastened to the counter bearing 43, in particular by means of a fastening nut 53, in particular in a region in which the counter bearing 43 is mounted relative to the crankshaft 32 via a rotary bearing 54, in particular a needle bearing.

Figure 7:
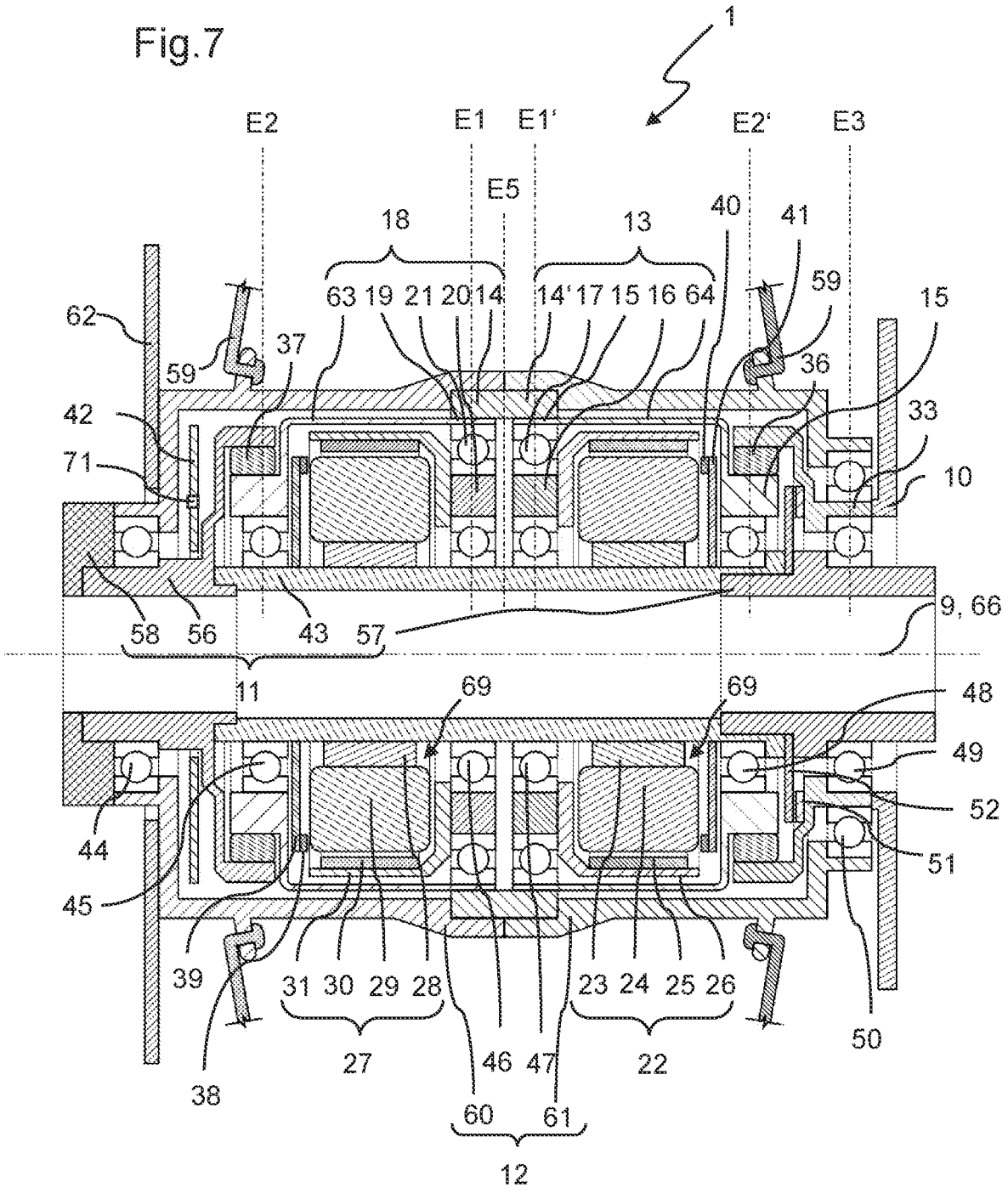
FIG. 7: is a cross-sectional view along the rotation axis through the hub drive unit.

FIG. 7 shows a cross-section through the drive unit 1 configured as a hub drive unit along the rotation axis 9 or the wheel axis 66. The configuration of the drive unit 1 is for the most part similar to the drive unit 1 configured as a center drive unit. Therefore, only the differences from the above embodiment will be discussed. In particular, when the drive unit 1 is configured as a hub drive unit, there is no crankshaft 32 passing through the drive unit 1. Instead, the drive unit 1 is passed through by a stationary, static axle body 11, which comprises, for example, the counter bearing 43 as well as various stationary housing parts 56, 57 and a connector housing 58 for the electronic control unit 42. The input shaft 33 is not moved directly by the pedals 6 or the crankshaft 32, but the pedal movement is transmitted to the input shaft 33 via the traction means 3 and the traction means gearwheel 10. Further, the output shaft 12 is not connected to the traction means gearwheel 10, but is formed by a rotating hub housing with hub housing parts 60, 61, which are connected to the ring gear 14, 14' in a co-rotating manner. The spokes 59 of the rear wheel are arranged on the hub housing parts 60, 61. In addition, a brake disc 62 is also arranged on the hub housing. Otherwise, the embodiment of the drive unit 1 as a hub drive unit corresponds to that as a center drive unit, and thus reference is made to the above discussion to avoid repetition.

All in all, the invention makes it possible to provide a particularly compact drive unit 1 in terms of its axial extent along the rotation axis 9. In addition, the drive unit 1 according to the invention can be used to represent a plurality of control functions desired in modern means of locomotion F, such as pedelecs.

What is claimed is:

1. A drive unit for a means of locomotion drivable simultaneously by drive energy provided by human muscular strength and by electric motors, comprising:

an input shaft for transmitting drive energy generated from human muscular strength, an output shaft for delivering drive energy to a travel unit;

a harmonic drive gearing arranged around a rotation axis and having a first wave generator, a first flexspline and a ring gear;

an electric drive motor arranged around the rotation axis and having a stator and a rotor, wherein drive energy of the electric drive motor is transmittable to the output shaft via the harmonic drive gearing;

a harmonic variation gearing arranged in a drive train between the input shaft and the output shaft and having a second wave generator, a second flexspline and a ring gear, the harmonic variation gearing being arranged such that the harmonic variation gearing receives drive energy of the input shaft obtained from human muscular strength and transmits the drive energy of the input shaft obtained from human muscular strength to the output shaft of the drive unit;

an electric variation motor with a stator and a rotor, drive energy of the electric variation motor introduced into the harmonic variation gearing, wherein summed drive energy from the human muscular strength and the electric variation motor is transmittable to the output shaft by the harmonic variation gearing, wherein the ring gear of the harmonic drive gearing and the ring gear of the harmonic variation gearing are configured in a co-rotating manner relative to each other and transmit summed drive energy from the human muscular strength, the electric drive motor and the electric variation motor to the output shaft.

2. The drive unit according to claim 1, wherein the harmonic variation gearing and/or the electric variation motor are arranged around the rotation axis.

3. The drive unit according to claim 1, wherein the harmonic variation gearing forms a continuously variable transmission between the input shaft and the output shaft.

4. The drive unit according to claim 1, wherein at least one of the first and second flexsplines is configured as a sleeve extending in a direction of the rotation axis, which is connected on one axial side to a rotary bearing and toward another axial side has an engagement region for the first or second wave generator, respectively, wherein a sleeve cavity is provided between the rotary bearing and the first or second wave generator, respectively, as seen in the direction of the rotation axis, and at least one of the electric drive and variation motors is arranged in axial direction of the rotation axis at least partially in the sleeve cavity of the harmonic drive or variation gearing associated with the electric drive or variation motor, respectively.

5. The drive unit according to claim 1, wherein the first wave generator, the first flexspline and the ring gear of the harmonic drive gearing are arranged overlapping one another in a gearing plane perpendicular to the rotation axis, and the first flexspline is mounted rotatably with respect to a counter bearing in a bearing plane perpendicular to the rotation axis, wherein the electric drive motor is arranged between the gearing plane and the bearing plane, and/or wherein the second wave generator, the second flexspline and the ring gear of the harmonic variation gearing are arranged overlapping one another in a gearing plane perpendicular to the rotation axis, and the second flexspline is mounted rotatably with respect to a counter bearing in a bearing plane perpendicular to the rotation axis, wherein the electric variation motor is arranged between the gearing plane and the bearing plane.

6. The drive unit according to claim 1, wherein a speed and/or rotation angle sensor is provided at the electric drive motor and/or at the electric variation motor.

7. The drive unit according to claim 1, wherein a rotary bearing for the output shaft and a rotary bearing for the input shaft are arranged in a common shaft bearing plane perpendicular to the rotation axis.

8. The drive unit according to claim 1, wherein the electric drive and variation motors and/or the harmonic drive and variation gearings are arranged coaxially with respect to one another about the rotation axis.

9. The drive unit according to claim 1, wherein the harmonic drive and variation gearings and the drive and variation electric motors are configured and arranged symmetrically to one another with respect to a plane of symmetry extending perpendicular to the rotation axis.

10. The drive unit according to claim 1, wherein the input shaft is connected to the second flexspline of the harmonic variation gearing in a co-rotating manner at least in one direction of rotation, and the drive energy obtained from the human muscular strength is introduced into the harmonic variation gearing via the second flexspline.

11. The drive unit according to claim 1, wherein the first flexspline of the harmonic drive gearing is mounted on a stationary housing part via a freewheel.

12. The drive unit according to claim 11, wherein the freewheel is switchable or the first flexspline and the stationary housing part are connectable in a co-rotating manner by a separate clutch unit, so that the electric drive motor is operable as a generator which receives drive energy from the ring gear and converts the drive energy into electrical energy.

13. The drive unit according to claim 12, wherein above a maximum travel speed of the means of locomotion, the electric drive motor is operated with drive power opposite to that of the electric variation motor and of equal amount, so that overall drive power applied by the electric drive and variation motors to the output shaft is zero.

14. The drive unit according to claim 1, wherein a rotary bearing is arranged between a counter bearing and the first flexspline of the harmonic drive gearing in a bearing plane perpendicular to the rotation axis, and overlapping with a freewheel, and/or a rotary bearing is arranged between a counter bearing and the second flexspline of the harmonic variation gearing in a bearing plane perpendicular to the rotation axis, and overlapping with a freewheel.

15. The drive unit according to claim 1, wherein the first wave generator, the first flexspline and the ring gear of the harmonic drive gearing are arranged in a gearing plane perpendicular to the rotation axis together with a rotary bearing for the rotor of the electric drive motor, and/or wherein the second wave generator, the second flexspline and the ring gear of the harmonic variation gearing are arranged in a gearing plane perpendicular to the rotation axis together with a rotary bearing for the rotor of the electric variation motor.

16. The drive unit according to claim 1, wherein in a direction along the rotation axis, a shaft bearing plane, a bearing plane of the second flexspline of the harmonic variation gearing, a gearing plane of the harmonic variation gearing, a symmetry plane, a gearing plane of the harmonic drive gearing, and a bearing plane of the first flexspline of the harmonic drive gearing are arranged in succession.

17. The drive unit according to claim 1, wherein the drive unit is configured as a center drive unit, or as a hub drive unit.

18. The drive unit according to claim 1, wherein a maximum extent of the drive unit along the rotation axis is not more than 150 mm.

19. The drive unit according to claim 1, wherein a control unit for controlling the electric drive motor and/or the electric variation motor is provided, which has at least one of the following features:

the control unit is arranged together with a rotary bearing for a crankshaft in an electronics bearing plane perpendicular to the rotation axis;

the control unit is connected to a rotation angle and/or speed and/or torque sensor at the input shaft;

the control unit is connected to a travel speed sensor;

the control unit is connected to a speed and/or rotation angle sensor at the electric drive motor and/or the electric variation motor;

the control unit is connected to an amperemeter for the electric drive motor and/or for the electric variation motor;

the control unit controls the speeds and torques of the electric drive motor and the electric variation motor such that the summed drive energy, including the energy obtained from human muscular strength, at the output shaft corresponds to an energy requirement of the drive unit;

the control unit controls speed of the electric drive motor in proportion to travel speed;

the control unit activates a drive support function or a brake function depending on a direction of rotation of a shaft driven by the human muscular strength;

the control unit is connected to a suspension travel sensor of the means of locomotion and at least partially compensates a pedal kickback caused by compression of the means of locomotion by controlling the electric variation motor;

the control unit is connected to a display unit which is visible from outside through a viewing window in the drive unit;

the control unit brings the input shaft into a starting position by controlling the electric variation motor.

20. The drive unit according to claim 4, wherein the stator of at least one of the electric drive and variation motors is arranged in the axial direction of the rotation axis completely in the sleeve cavity, respectively.

21. The drive unit according to claim 1, wherein both of the first and second flexsplines are configured as a sleeve extending in a direction of the rotation axis, which is connected on one axial side to a rotary bearing and toward another axial side has an engagement region for the first or second wave generator, respectively, wherein a sleeve cavity is provided between the rotary bearing and the first or second wave generator, respectively, as seen in the direction of the rotation axis, and both of the electric drive and variation motors are arranged in axial direction of the rotation axis at least partially-in the sleeve cavity of the harmonic drive or variation gearing associated with the electric drive or variation motor, respectively.

22. The drive unit according to claim 5, wherein a sleeve of the first and/or second flexspline is mounted rotatably with respect to the counter bearing in the bearing plane perpendicular to the rotation axis, respectively.

23. The drive unit according to claim 6, wherein the speed and/or rotation angle sensor is arranged in a sleeve cavity of the first or second flexspline.

\* \* \* \* \*